United States Patent
Naeem

[11] Patent Number: 6,130,182
[45] Date of Patent: Oct. 10, 2000

[54] DIELECTRIC CATALYST STRUCTURES

[75] Inventor: Munir-ud-Din Naeem, Poughkeepsie, N.Y.

[73] Assignee: International Business Machines Corporation, Armonk, N.Y.

[21] Appl. No.: 08/900,404

[22] Filed: Jul. 25, 1997

[51] Int. Cl.[7] .............. B01J 23/58; F01N 3/10; B32B 13/04; H01L 23/48

[52] U.S. Cl. .......... 502/328; 502/306; 502/309; 502/315; 502/327; 502/330; 502/344; 502/355; 502/527.12; 502/527.13; 502/527.15; 502/439; 422/174; 422/199; 204/177; 204/164; 204/184.04; 428/446; 257/754; 257/761; 257/766

[58] Field of Search ................ 502/328, 306, 502/308, 309, 315, 313, 317, 318, 327, 330–341, 344–346, 350, 351, 355, 527.12, 527.13, 527.15, 439; 422/174, 199; 204/177, 164, 184.04; 428/446, 450, 472, 701, 702, 633, 641; 252/512, 514, 62.9 PZ

[56] References Cited

U.S. PATENT DOCUMENTS

| | | | |
|---|---|---|---|
| 3,598,635 | 8/1971 | Sagona | 117/93.1 |
| 3,928,533 | 12/1975 | Beall et al. | 423/213.2 |
| 3,930,890 | 1/1976 | Dietz | 502/527.15 |
| 3,966,646 | 6/1976 | Noakes et al. | 502/439 |
| 3,979,193 | 9/1976 | Sikich | 557/123 |
| 4,094,652 | 6/1978 | Lowther | 55/33 |
| 4,149,998 | 4/1979 | Tauster et al. | 252/473 |
| 4,159,353 | 6/1979 | Adelsberg et al. | 427/34 |
| 4,465,576 | 8/1984 | Negishi et al. | 204/192 E |
| 4,557,796 | 12/1985 | Druschke et al. | 156/643 |
| 4,703,028 | 10/1987 | Steininger | 502/178 |
| 4,711,009 | 12/1987 | Cornelison et al. | 29/157 R |
| 4,780,277 | 10/1988 | Tanaka et al. | 422/4 |
| 4,804,796 | 2/1989 | Wang et al. | 502/527.15 |
| 4,910,180 | 3/1990 | Berndt et al. | 502/304 |
| 4,976,929 | 12/1990 | Cornelison et al. | 422/174 |
| 4,992,407 | 2/1991 | Chakraborty et al. | 502/527.12 |
| 5,114,901 | 5/1992 | Tsang et al. | 502/439 |
| 5,234,882 | 8/1993 | Pfefferle | 502/314 |
| 5,236,672 | 8/1993 | Nunez et al. | 422/186.04 |
| 5,248,564 | 9/1993 | Ramesh | 428/210 |
| 5,313,089 | 5/1994 | Jones, Jr. | 257/295 |
| 5,316,738 | 5/1994 | Kojima et al. | 422/180 |
| 5,371,056 | 12/1994 | Leyrer et al. | 502/66 |
| 5,407,880 | 4/1995 | Ikeda et al. | 502/527.13 |
| 5,441,706 | 8/1995 | Whittenberger | 422/174 |
| 5,490,973 | 2/1996 | Grothaus et al. | 422/186.04 |
| 5,496,788 | 3/1996 | Domesle et al. | 502/333 |
| 5,512,251 | 4/1996 | Brunson et al. | 422/174 |
| 5,525,570 | 6/1996 | Chakraborty et al. | 502/326 |
| 5,525,834 | 6/1996 | Fischer et al. | 257/691 |
| 5,604,174 | 2/1997 | Friedman et al. | 502/439 |
| 5,609,736 | 3/1997 | Yamamoto | 204/164 |
| 5,632,961 | 5/1997 | Sheller | 502/439 |
| 5,696,394 | 12/1997 | Jones, Jr. et al. | 257/295 |
| 5,721,043 | 2/1998 | Summerfelt et al. | 428/210 |
| 5,721,188 | 2/1998 | Sung et al. | 502/439 |
| 5,736,422 | 4/1998 | Lee et al. | 437/201 |
| 5,756,223 | 5/1998 | Cameron et al. | 428/688 |
| 5,776,621 | 7/1998 | Nashimoto | 428/688 |
| 5,786,097 | 7/1998 | Scanlan | 428/469 |
| 5,804,323 | 9/1998 | McKee et al. | 428/700 |
| 5,837,405 | 11/1998 | Ahn et al. | 505/236 |
| 5,849,669 | 12/1998 | Wen | 505/190 |
| 5,851,948 | 12/1998 | Chuang et al. | 502/314 |
| 5,866,238 | 2/1999 | Takayama et al. | 428/209 |
| 5,880,508 | 3/1999 | Wu | 257/411 |
| 5,914,015 | 6/1999 | Barlow et al. | 204/177 |

*Primary Examiner*—Mark L. Bell
*Assistant Examiner*—Patricia L. Hailey
*Attorney, Agent, or Firm*—Daryl K. Neff

[57] ABSTRACT

A reactor for corona destruction of volatile organic compounds (VOCs), a multi-surface catalyst for the reactor and a method of making the catalyst for the reactor. The reactor has a catalyst of a high dielectric material with an enhanced surface area. A catalyst layer stack is formed by depositing a high dielectric layer on a substrate and, then depositing a conductive layer on the dielectric layer. The catalyst layer stack is bombarded by low RF energy ions to form an enhanced surface area and to form a protective layer over the conductive layer. Catalyst layer stacks may be joined back to form double-sided catalyst layer stacks. The catalyst layer stack may be diced into small pieces that are used in the reactor or the whole catalyst layer stack may be used.

20 Claims, 4 Drawing Sheets

DIELECTRIC CATALYST STRUCTURES

Related Application Data

This application is related to the following applications which are assigned to the same owner and filed on even date herewith: "Catalytic Reactor" U.S. patent application Ser. No. 08/900,405, (Attorney Docket No. FI9-97-065), "Method of Making Dielectric Catalyst Structures" U.S. patent application Ser. No. 08/900,406, (Attorney Docket No. FI9-97-065).

BACKGROUND OF THE INVENTION

1. Field of the Invention

The present invention relates to catalyst materials, and more specifically to dielectric catalyst materials for use in catalytic reactors which produce high electric fields or corona discharge.

2. Background Description

Corona destruction of volatile organic compounds (VOCs) is a method of disposing of noxious or toxic gases or other atmospheric contaminants or pollutants. The unwanted gas is decomposed into a less polluting gas that may be vented into the atmosphere. The unwanted gases, generally VOC, are passed over a bed of catalyst in a reactor, while a high alternating current (AC) voltage is passed across the bed to produce a corona discharge. A dielectric material catalyst in the reactor produces a stable corona and the VOCs are converted to $CO_2$ gas.

Typically, prior art reactors are large and expensive. Further these large reactors require, typically, at least 10 kilovolts (kV) to generate the corona.

Thus, there is a need for cheaper, smaller, more compact reactors that are effective at lower voltage.

In addition to decomposing VOCs, catalytic reactors are used with high electric fields or corona discharge to facilitate a variety of chemical reactions.

PURPOSES OF THE INVENTION

It is a purpose of the invention to provide a dielectric catalyst structure which can be utilized in a catalytic reactor, especially a reactor which produces high electric fields or corona discharge, to increase the efficiency and lower the operating costs of such reactor.

It is another purpose of the present invention to provide a catalyst structure which decreases the voltage required to produce an electric field of a given strength.

It is yet another purpose of the present invention to provide a catalyst structure which permits a catalytic reactor in which the structure is used to be reduced in size.

SUMMARY OF THE INVENTION

These and other purposes are addressed by the method of making a catalyst structure according to the present invention. Catalyst structures for a catalytic reactor, especially a reactor which utilizes high electric fields or corona discharge, are provided according to the present invention.

Catalyst structures are prepared from plates or wafers including a substrate of material which is essentially non-conductive or semiconductive; i.e. the substrate material is not essentially conductive. In a highly preferred embodiment, the substrate may be a waste wafer which has been processed through one or several steps in the fabrication of electrical devices. Over the substrate is formed a layer of material having a high dielectric constant, such as lead zirconium titanate (PZT), barium titanate ($BaTiO_3$), strontium titanate ($SrTiO_3$), or a zeolite material, which material effectively lowers the voltage at which a reactor containing the catalyst structures can be operated. A layer of conducting material is formed over the high dielectric material layer. In a preferred embodiment, a protective nonconductive coating, such as a thin oxide layer, is placed over the conducting layer.

Preferably, the conducting layer is rough surface conditioned to increase the surface are of the catalyst structure in contact with gaseous mixtures as used in a reactor. Preferably, the surface conditioning is performed by bombardment of the conducting layer with relatively low radio frequency energy ions in an atmosphere including oxygen to form an enhanced surface area catalyst structure having a rough surface thin oxide layer above the conducting layer.

Preferably, the conducting layer consists essentially of one or more metals selected from the group consisting of copper, gold, aluminum, titanium, tungsten, nickel, palladium, and platinum. Preferably, the substrate consists essentially of a semiconductor or a nonconductor material such as glass, a ceramic material, aluminum oxide, silicon, germanium, silicon-germanium, gallium arsenide, etc.

In a highly preferred embodiment, the catalyst structure is bonded to a second catalyst structure in substrate to substrate fashion to form a double-sided catalyst structure having exterior facing conducting layers. Alternatively, or in addition, the catalyst structure may be diced into smaller pieces for use in a catalyst bed of a catalytic reactor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
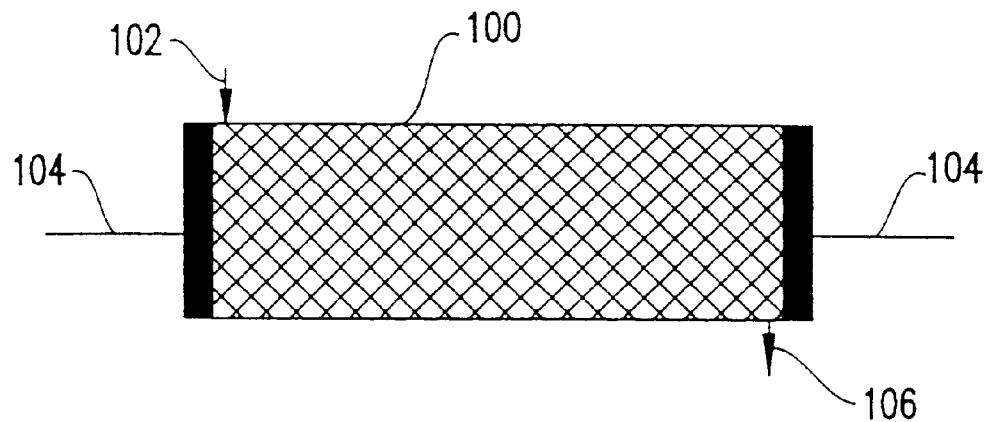
FIG. 1 is a schematic representation of a first preferred embodiment of the present invention.

A preferred embodiment of the present invention is a catalytic reactor, preferably a multi-surface reactor for corona destruction of volatile organic compounds (VOCs). In a first preferred embodiment, as represented schematically in FIG. 1, the reactor includes a vessel 100 filled with catalyst coated substrate pieces (as represented by the cross-hatching). Preferably, vessel 100 is cylindrical. Noxious or polluting gas enters reactor vessel 100 through an inlet 102. Alternating current (AC) is applied to reactor 100 at electrodes 104 to generate a corona therein. Preferably, electrodes 104 are located at opposite ends of the cylindrical reactor vessel 100. A gaseous mixture of unwanted gases such as volatile organic compounds, e.g. hydrocarbons, chlorinated hydrocarbons and desirable gases, e.g. air, enters reactor vessel 100 filters through the catalyst coated substrate pieces, exiting through outlet 106. Gas in the reactor is exposed to the corona in the presence of the catalyst as it filters through the reactor 100. The resulting decontaminated gas and reaction byproducts exit through the outlet 106.

Figure 2:
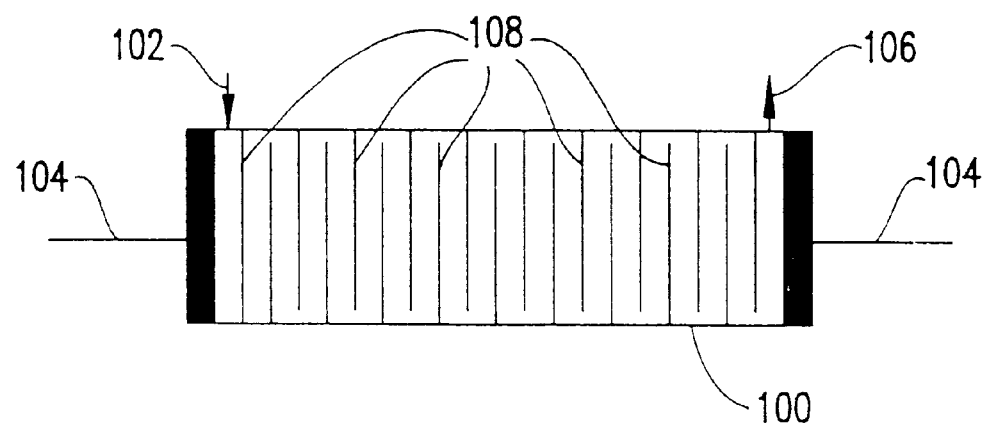
FIG. 2 is a schematic representation of a second preferred embodiment of the present invention.

FIG. 2 schematically represents a second embodiment wherein, reactor vessel 100 includes catalyst coated substrate plates or wafers 108 arranged in parallel with a space between adjacent parallel plates 108. The catalyst coated plates 108 of the second embodiment are of identical material and construction as the catalyst coated pieces of the first embodiment. In this embodiment, noxious or polluting gas enters reactor 100 through an inlet 102 and passes between parallel plates 108, along a maze-like path formed by the arrangement of plates until the resultant gas exits at outlet 106. The gas is exposed to the corona as it passes through the reactor 100.

Figure 3A:
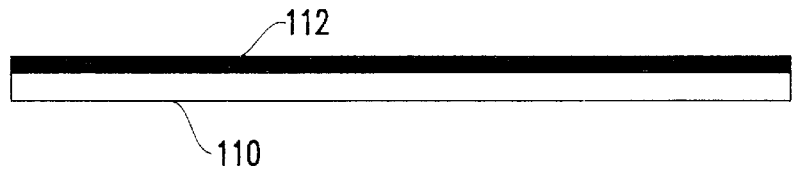
FIGS. 3A–C represent the steps in forming catalyst coated substrates according to a preferred embodiment of the present invention.
Figure 3B:
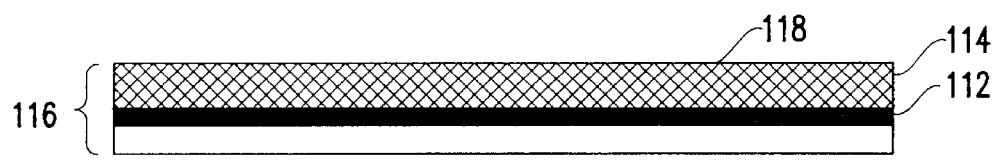
Figure 3C:
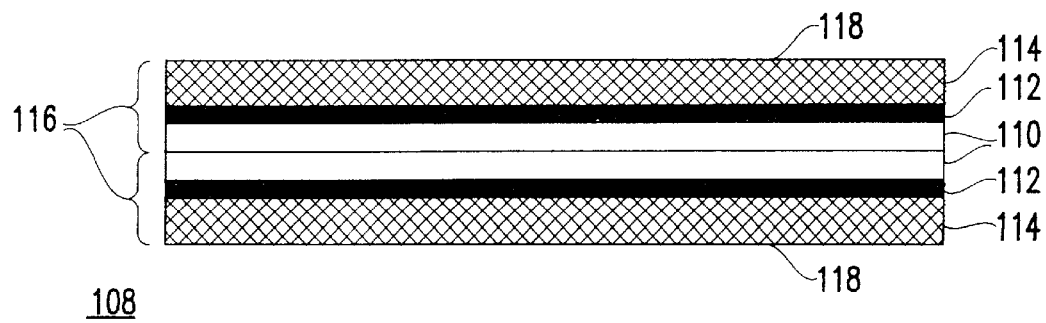

FIGS. 3A–C represent the steps in forming the catalyst coated plates or wafers 108. Plates or wafers 108 include a substrate having at least an outer layer of semiconductor or nonsemiconductor material, which material is typically and preferably silicon (Si). First, in FIG. 3A, a high dielectric (K) material is deposited on a substrate plate or wafer 110. The substrate plate or wafer may be a waste substrate or wafer having been processed through one, several, or all steps for fabricating electronic devices or integrated circuits, so long as the substrate is not composed entirely of conductor material and has esssentially a semiconductive or non-conductive outer surface.

Preferably, dielectric film 112 is sputter deposited in an $O_2$/Ar atmosphere (50/50 by volume) by radio frequency (RF) or DC magnetron sputtering from a titanate target, preferably a titanate of barium (Ba) or strontium (Sr) such as $BaTiO_3$ or $SrTiO_3$. Alternatively, a target of lead zirconium titanate (PZT) or a zeolite material may be used for deposition of dielectric film 112. Dielectric film 112 is 1–500 nanometer (nm) thick, typically 200–300 nm and preferably 250 nm in thickness.

Alternatively, film 112 may be formed by electron beam evaporation or chemical vapor deposition (CVD) or wet chemical deposition.

Next, in FIG. 3B, a conducting film 114 is formed on the high dielectric film 112 to form a film stack 116. Preferably, conducting film 114 is a layer including copper (Cu), of thickness between 5–500 nm, typically 20–100 nm, and preferably 50 nm. Alternatively, any suitable metal such as gold (Au), aluminum (Al), Titanium (Ti), Tungsten (W), nickel (Ni), palladium (Pd) or platinum (Pt) may be substituted for copper. Conducting film 114 may be formed by any suitable method such as sputtering, CVD, electroplating or electron beam (e-beam) evaporation.

Next, the film stack 116 is bombarded with oxygen ions using low energy radio frequency RF to form a rough surface oxide film on the surface 118 of conducting film 114, thereby increasing the area of surface 118. The thin oxide film thus formed protects the conducting film 114 from corrosion while increasing the surface area of the catalyst in contact with the gaseous mixtures. Surface area enhancement and metal oxide formation is performed in an $O_2$/Ar mixture between 0.2 to 1 by volume, preferably 0.5. Alternatively, an appropriate inert or non-reactive gas may be substituted for Ar. The $O_2$/Ar mixture total flow rate is between 50 to 300 standard cubic centimeters per minute (sccm), typically 50 to 250 sccm and, preferably, 100 sccm. Pressure is maintained between 100 to 500 mT, typically 200–400 mT and, preferably, 300 mT.

The plate or wafer is mounted on a chuck with Helium (He) backside cooling to maintain the film temperature below 300° C. Helium pressure is maintained between 4 and 30 torr, typically, 4 to 14 torr and, preferably, 9 torr. The chamber wall and cathode temperatures are maintained between 5 to 60° C., with typical wall temperature between 16–50° C., preferably at 36.5° C. and with typical cathode temperature 8–20° C., preferably at 16.2° C. RF power between 300 to 1400W, typically 500–900W and, preferably, 700W is applied to bombard the target with ion energy below 500 eV for 10 to 70 seconds, typically between 40–60 seconds and preferably, 50 seconds using up to a 90 Gauss magnetic field, typically 40–70 Gauss and, preferably 60 Gauss.

Finally, in FIG. 3C, two identical film stacks 116 are joined back to back, forming a catalyst coated plate or wafer 108. Alternatively, two plates of different construction according to the embodiments disclosed herein may be joined back to back. The plate or wafer may be used in constructing a reactor according to a second preferred embodiment (FIG. 2) or, cut into relatively small pieces for use in a reactor constructed according to a first preferred embodiment (FIG.1).

Figure 4:
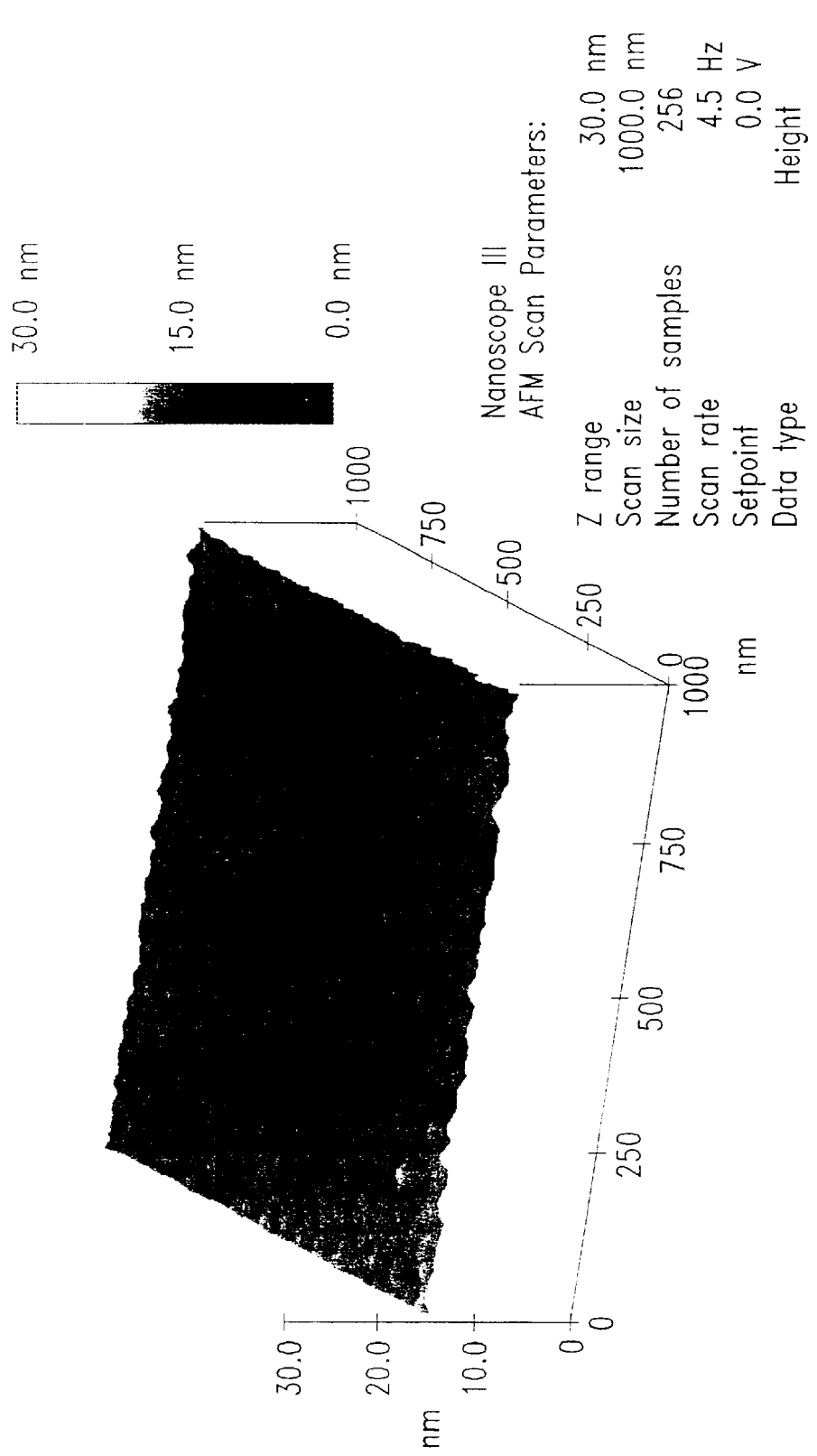
FIG. 4 is a reproduction of an atomic force microscopy image of conducting film 114 formed without ion bombardment.
Figure 5:
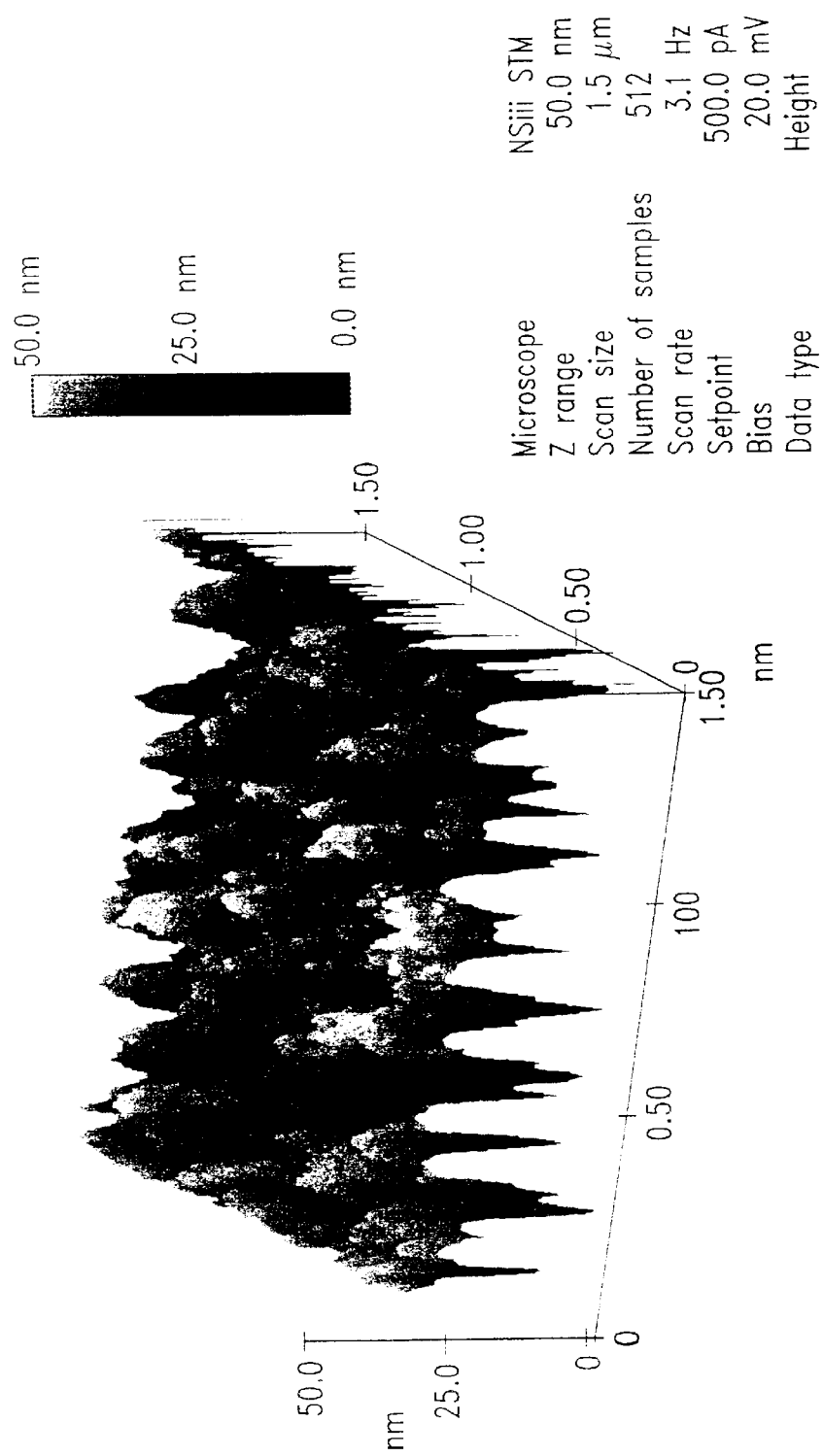
FIG. 5 is a reproduction of an atomic force microscopy image of conducting film 114 after ion bombardment according to the preferred embodiment of the present invention.

FIG. 4 is a reproduction of an atomic force microscopy image of conducting film 114 prior to surface area enhancement using ion bombardment, at which time the surface 118 is fairly smooth. FIG. 5 is a reproduction of an atomic force microscopy image of conducting film 114 after ion bombardment performed according to the preferred embodiment of the present invention. As will be recognized, the surface area of surface 118 shown in FIG. 5 exhibits considerable surface area enhancement over the smoother surface 118 shown in FIG. 4.

While the invention has been described with reference to certain preferred embodiments thereof, those skilled in the art will recognize that many modifications of the invention can be practiced within the spirit and scope of the appended claims.

I claim:

1. A catalyst structure comprising:
   a substrate;
   a first layer of dielectric material having a high dielectric constant disposed on a first surface of said substrate;
   a first electrically conducting layer disposed over said first dielectric material layer; and
   a second layer of dielectric material having a high dielectric constant disposed on a second surface of said substrate opposite said first surface and a second electrically conducting layer disposed over said second dielectric material layer.

2. The catalyst structure of claim 1 wherein said first electrically conducting layer forms a rough, enhanced area surface.

3. The catalyst structure of claim 1 further comprising a protective coating disposed on said first electrically conducting layer and on said second electrically conducting layer.

4. The catalyst structure of claim 3 wherein said protective coating includes an oxide of a metal included in said first and second electrically conducting layers.

5. The catalyst structure of claim 4 wherein said protective coating forms a rough, enhanced area surface.

6. The catalyst structure of claim 5 wherein said first and said second electrically conducting layers consist essentially of metal.

7. The catalyst structure of claim 6 wherein said first and said second electrically conducting layers consist essentially of copper.

8. The catalyst structure of claim 6 wherein said first and said second electrically conducting layers consist essentially of one or more metals selected from the group consisting of copper, gold, aluminum, titanium, tungsten, nickel, palladium, and platinum.

9. The catalyst structure of claim 1 wherein said first dielectric material layer and said second dielectric material layer each includes a material selected from the group consisting of lead zirconium titanate (PZT), $BaTiO_3$ and $SrTiO_3$.

10. The catalyst structure of claim 9 wherein said first and said second dielectric material layers each consist essentially of lead zirconium titanate (PZT).

11. A catalyst structure comprising:
   a substrate;
   a layer of dielectric material having a high dielectric constant disposed on a first surface of said substrate, said dielectric material including a zeolite material; and
   an electrically conducting layer disposed over said dielectric material layer.

12. A catalyst structure comprising:
   a substrate including semiconductor material;
   first and second dielectric layers including material having a high dielectric constant on respective opposite sides of said substrate;
   first and second electrically conducting layers consisting essentially of metal formed on respective first and second dielectric material layers; and
   first and second oxide layers formed on said respective first and second electrically conducting layers, said respective electrically conducting layers and said oxide layers forming rough, enhanced area surfaces.

13. The catalyst structure of claim 12 wherein said first and said second dielectric material layers include a material selected from the group consisting of lead zirconium titanate (PZT), $BaTiO_3$, $SrTiO_3$, and zeolites.

14. The catalyst structure of claim 13 wherein said first and said second electrically conducting layers consist essentially of one or more metals selected from the group consisting of copper, gold, aluminum, titanium, tungsten, nickel, palladium, and platinum.

15. The catalyst structure of claim 14 wherein said substrate material includes silicon, and said first and said second electrically conducting layers consist essentially of copper.

16. A catalyst structure for use in a corona discharge reactor for decomposing a volatile organic compound (VOC), comprising:
   a substrate including a material selected from semiconductors and nonconductors;
   first and second dielectric layers consisting essentially of material having a high dielectric constant on opposite sides of said substrate;
   first and second electrically conducting layers consisting essentially of metal formed on said respective first and second dielectric layers; and
   first and second oxide layers formed on said respective first and second electrically conducting layers, said respective electrically conducting layers and said oxide layers forming rough, enhanced area surfaces for contact with a gaseous mixture containing said VOC.

17. The catalyst structure of claim 16 wherein said first and said second electrically conducting layers consist essentially of one or more metals selected from the group consisting of copper, gold, aluminum, titanium, tungsten, nickel, palladium, and platinum.

18. The catalyst structure of claim 17 wherein said first and said second dielectric material layers include a material selected from the group consisting of lead zirconium titanate (PZT), $BaTiO_3$, $SrTiO_3$, and zeolites.

19. The catalyst structure of claim 18 wherein said substrate material includes silicon, and said first and said second electrically conducting layers consist essentially of copper.

20. A catalyst structure comprising:
   a substrate;
   a layer of dielectric material having a high dielectric constant disposed on a first surface of said substrate;
   an electrically conducting layer disposed over said dielectric material layer; and
   a protective coating disposed over said electrically conducting layer, said protective coating including an oxide of a metal included in said electrically conducting layer.

* * * * *